United States Patent
Onodera

(10) Patent No.: US 10,614,203 B2
(45) Date of Patent: Apr. 7, 2020

(54) ROBOT-HUMAN INTERACTIVE DEVICE WHICH PERFORMS CONTROL FOR AUTHENTICATING A USER, ROBOT, INTERACTION METHOD, AND RECORDING MEDIUM STORING PROGRAM

(71) Applicant: CASIO COMPUTER CO., LTD., Shibuya-ku, Tokyo (JP)

(72) Inventor: Yutaka Onodera, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 233 days.

(21) Appl. No.: 15/289,078

(22) Filed: Oct. 7, 2016

(65) Prior Publication Data

US 2017/0169203 A1    Jun. 15, 2017

(30) Foreign Application Priority Data

Dec. 14, 2015    (JP) .................................. 2015-243001

(51) Int. Cl.
| | |
|---|---|
| G06F 21/32 | (2013.01) |
| G10L 17/02 | (2013.01) |
| G06K 9/00 | (2006.01) |
| G10L 15/02 | (2006.01) |
| G10L 17/06 | (2013.01) |
| G10L 17/22 | (2013.01) |

(Continued)

(52) U.S. Cl.
CPC ......... *G06F 21/32* (2013.01); *G06K 9/00288* (2013.01); *G06K 9/00892* (2013.01); *G10L 15/02* (2013.01); *G10L 17/02* (2013.01); *G10L 17/06* (2013.01); *G10L 17/22* (2013.01); *G10L 25/60* (2013.01); *G10L 25/63* (2013.01); *G10L 2015/025* (2013.01)

(58) Field of Classification Search
CPC ....... H04M 3/382; G06Q 20/20; H04L 51/12; G06N 3/008; G10L 25/78
USPC .......................................................... 726/19
See application file for complete search history.

(56) References Cited

U.S. PATENT DOCUMENTS

| | | | |
|---|---|---|---|
| 8,255,223 B2 * | 8/2012 | Wang ...................... | G06F 21/31 704/246 |
| 9,431,029 B2 * | 8/2016 | Yook ....................... | G10L 25/78 |

(Continued)

FOREIGN PATENT DOCUMENTS

| | | |
|---|---|---|
| CN | 203861914 U | 10/2014 |
| JP | 2006006586 A | 1/2006 |

(Continued)

OTHER PUBLICATIONS

Chinese Office Action dated Feb. 11, 2019 (and English translation thereof) issued in counterpart Chinese Application No. 201611019757.0.

(Continued)

*Primary Examiner* — Bryan F Wright
(74) *Attorney, Agent, or Firm* — Holtz, Holtz & Volek PC

(57) ABSTRACT

An interactive device includes an authenticator for authenticating a user, a speech urger which urges the user to speak when the authenticator unsuccessfully authenticates the user, and an interaction controller which performs interaction according to the authenticated user when the authenticator successfully authenticates the user by a voice of the user having been urged to speak.

14 Claims, 3 Drawing Sheets

(51) Int. Cl.
*G10L 25/60* (2013.01)
*G10L 25/63* (2013.01)

(56) References Cited

U.S. PATENT DOCUMENTS

| | | | | |
|---|---|---|---|---|
| 2002/0081937 | A1* | 6/2002 | Yamada | A63H 3/48 446/175 |
| 2006/0165265 | A1* | 7/2006 | Fujimatsu | G06K 9/00604 382/117 |
| 2007/0192910 | A1* | 8/2007 | Vu | B25J 5/007 700/245 |
| 2008/0255702 | A1* | 10/2008 | Lin | G06N 3/008 700/245 |
| 2009/0083826 | A1* | 3/2009 | Baribault | H04L 51/12 726/1 |
| 2012/0264405 | A1* | 10/2012 | Bravo | H04M 3/382 455/414.1 |
| 2013/0304478 | A1* | 11/2013 | Sun | G10L 17/04 704/273 |
| 2014/0172430 | A1* | 6/2014 | Rutherford | G06Q 20/20 704/273 |
| 2015/0264572 | A1* | 9/2015 | Turgeman | H04W 12/06 455/411 |
| 2016/0150124 | A1* | 5/2016 | Panda | H04N 1/442 358/1.13 |
| 2018/0165931 | A1* | 6/2018 | Zhang | G08B 13/19613 |

FOREIGN PATENT DOCUMENTS

| | | |
|---|---|---|
| JP | 2006208964 A | 8/2006 |
| JP | 2007152444 A | 6/2007 |
| JP | 2007156688 A | 6/2007 |
| JP | 2009178783 A | 8/2009 |

OTHER PUBLICATIONS

Japanese Office Action (and English language translation thereof) dated Sep. 3, 2019 issued in counterpart Japanese Application No. 2015-243001.
What's PARO? Daiwa House Industry Co., Ltd., Homepage.

* cited by examiner

FIG. 3

AUTHENTICATION DB 31

| USER NAME | FACE IMAGE | VOICEPRINT |
|---|---|---|
| A | A1 | A2 |
| B | B1 | B2 |
| : | : | : |
| Z | Z1 | Z2 |

FIG. 4

PERSONAL INFORMATION DB 32

| USER NAME | PERSONAL INFORMATION | |
|---|---|---|
| | NICKNAME | PROFILE |
| A | MR. A | a |
| B | MR. B | b |
| : | : | : |
| Z | MR. Z | z |

FIG. 5

QUESTION TEMPLATE

| |
|---|
| How are you today? |
| How was your day today? |
| What shall we talk about? |

FIG. 6

ANSWER TEMPLATE

| INPUT TEXT | OUTPUT TEXT | PERSONAL INFORMATION | EMOTION-EXPRESSING PARAMETER |
|---|---|---|---|
| ○○○ | ××× | A | GOOD |

ROBOT-HUMAN INTERACTIVE DEVICE WHICH PERFORMS CONTROL FOR AUTHENTICATING A USER, ROBOT, INTERACTION METHOD, AND RECORDING MEDIUM STORING PROGRAM

CROSS-REFERENCE TO RELATED APPLICATION

This application claims the benefit of Japanese Patent Application No. 2015-243001, filed on Dec. 14, 2015, the entire disclosure of which is incorporated by reference herein.

FIELD

This application relates generally to a technique for a robot to authenticate a user and interact with the user.

BACKGROUND

Recently, robots authenticating a user (for example, a personal authentication, age and/or gender authentication, and the like) and accordingly interacting with the authenticated user have been known.

Patent Literature 1 discloses a robot that, in regard to robotic authentication, vocally guides a user to place his face in the field angle when his face is not within the field angle.

Patent Literature 1: Unexamined Japanese Patent Application Kokai Publication No. 2007-152444.

SUMMARY

The interactive device of the present disclosure includes:
an authenticator authenticating a user;
a speech urger urging the user to speak when the authenticator unsuccessfully authenticates the user; and
an interaction controller performing interaction according to the authenticated user when the authenticator successfully authenticates the user by voice of the user urged to speak.

BRIEF DESCRIPTION OF THE DRAWINGS

A more complete understanding of this application can be obtained when the following detailed description is considered in conjunction with the following drawings, in which:

FIG. 3 is a chart showing an example of the authentication database (DB);

FIG. 4 is a chart showing an example of the personal information DB;

FIG. 5 is a chart showing an example of the question template;

FIG. 6 is a chart showing an example of the answer template; and

DETAILED DESCRIPTION

Figure 1:
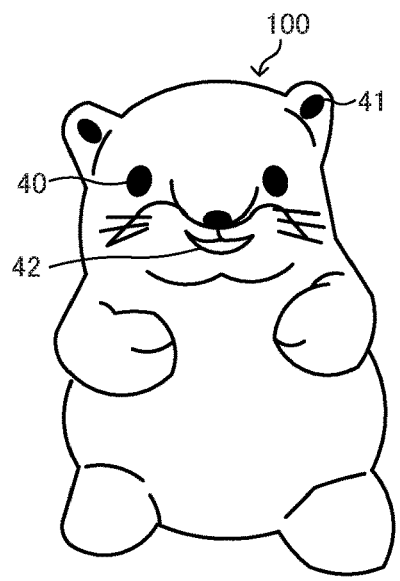
FIG. 1 is an illustration showing the appearance of the robot according to an embodiment.

The interactive device according to an embodiment of the present disclosure will be outlined hereafter with reference to FIG. 1. An interactive device 1 is an interactive engine authenticating a user and interacting with the user who is an interactive partner, and built in a robot 100. With the interactive device 1 built therein, the robot 100 comprises artificial intelligence as a communication robot and is capable of interacting with a user. An external server can be used as the artificial intelligence body.

The robot 100 comprises, as interfaces to the user, a microphone 41 collecting voice of the user in an ear part, a speaker 42 outputting sound to the user in a mouth part, and a camera 40 capturing an image of the user in an eye part. The robot 100 is made of a cuddly material and has a cute appearance so that people feel personable. This embodiment is described using the case in which the robot 100 is a toy. However, the application is not restricted to toys and the robot 100 is applicable to anything requiring communication.

Figure 2:
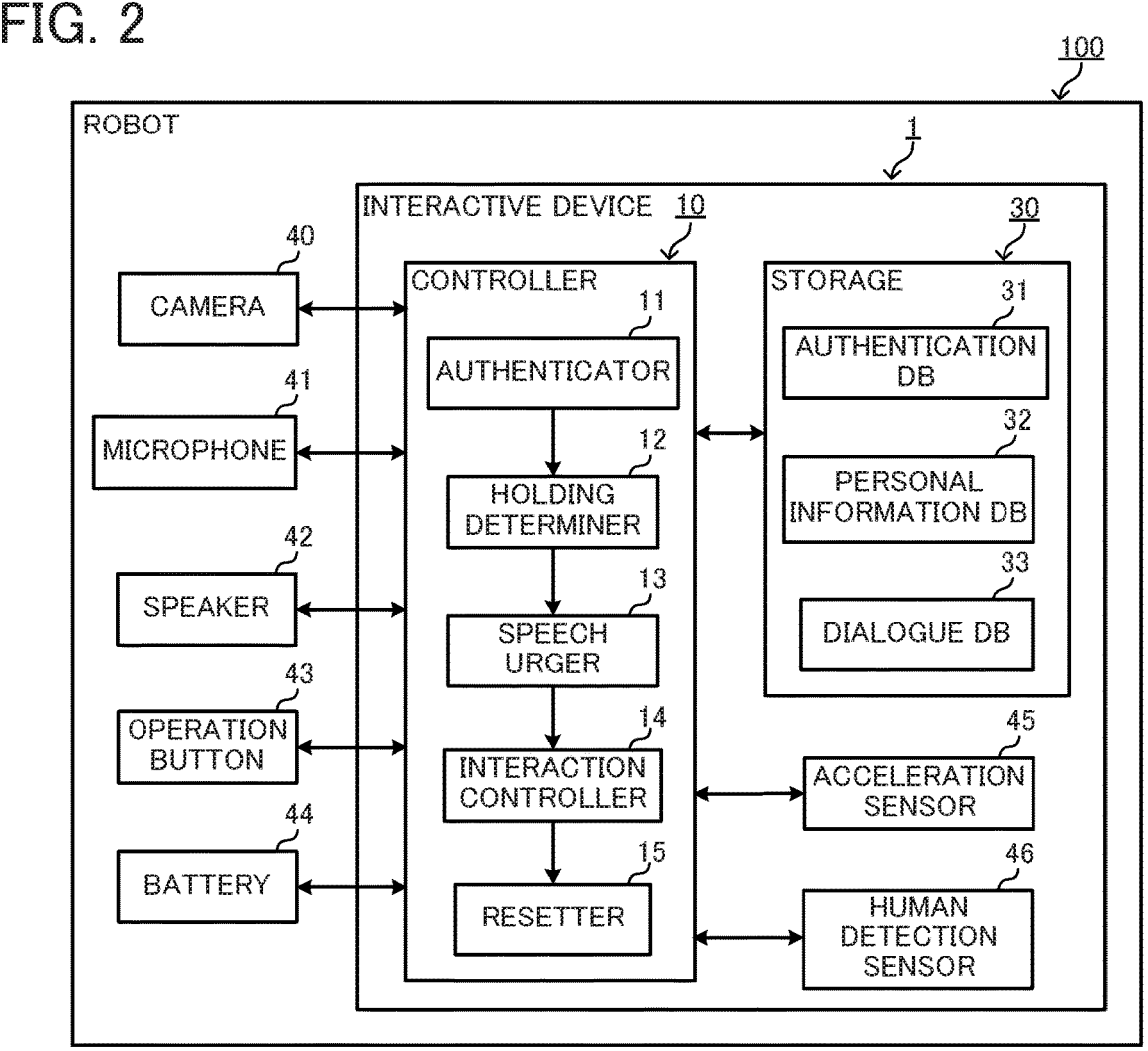
FIG. 2 is a diagram showing the configuration of the robot according to the embodiment.

As shown in FIG. 2, the robot 100 comprises, besides the above interfaces (camera 40. microphone 41, and speaker 42), an operation button 43, a battery 44, and an interactive device 1.

The operation button 43 comprises various buttons for operating the interactive device 1 and includes, for example, a power button. The battery 44 is a rechargeable battery built in the robot 100.

The interactive device 1 comprises an acceleration sensor 45, a human detection sensor 46, a controller 10, and a storage 30.

The acceleration sensor 45 is a sensor measuring the acceleration in the XYZ directions (three axes). The acceleration sensor 45 is used to detect whether the device is in the held state including a state in which the user is holding the robot 100 as described later.

The human detection sensor 46 is a sensor that detects a person. The human detection sensor 46 is used to detect whether a person is near the robot 100 as described later.

The controller 10 is configured by a central processing unit (CPU), a read only memory (ROM), a random access memory (RAM), and the like. The controller 10 executes programs (for example, programs regarding the interaction procedure described later) stored in the ROM to realize the functions of components (an authenticator 11, a holding determiner 12, a speech urger 13, an interaction controller 14, and a resetter 15).

The storage 30 is a nonvolatile memory such as a flash memory. Databases (an authentication DB 31, a personal information DB 32, and a dialogue DB 33) will be described later.

The functions of the controller 10 will be described next.

The controller 10 functionally comprises an authenticator 11, a holding determiner 12, a speech urger 13, and an interaction controller 14. Here, the controller 10 may be provided entirely or partly outside the robot 100 and externally control the robot 100.

The authenticator 11 authenticates the user by voice or an image. This embodiment is described using the case of a personal authentication to identify the user's personal information (for example, detailed information such as nickname and profile). In this case, the authenticator 11 performs a personal authentication of the user using voice or an image (particularly, a face image).

Specifically, the authenticator 11 uses the authentication DB 31 for a personal authentication. The authentication DB 31 is a database associating each user with his face image and voiceprint as shown in FIG. 3. For a personal authentication, the authenticator 11 compares a face image captured by the camera 40 with face images A1 to Z1 stored in the authentication DB 31 in sequence. Then, the authenticator 11 searches for a face image having a degree of similarity equal to or higher than a threshold at which the face image is authenticated as himself and identifies the user name associated with the face image. Here, it may be possible that the authentication DB 31 stores face characteristic quantities of each user using the scale-invariant feature transform (SIFT) or the like in place of the face images, and the authenticator 11 makes comparisons with face characteristic quantities extracted from a face image captured by the camera 40 to identify the user name.

On the other hand, the authenticator 11 performs a personal authentication using voice in addition to a face image. In this case, the authenticator 11 compares the voiceprint obtained from the voice collected by the microphone 41 (the sound spectrogram presenting the frequency distribution of the voice) with voiceprints A2 to Z2 stored in the authentication DB 31 in sequence and identifies the user name associated with the most similar voiceprint. Alternatively, it may be possible that the authentication DB 31 stores phonemes (minimum unit of sound) of each user in place of the voiceprint and the authenticator 11 breaks down the collected voice into phonemes and makes comparisons on the basis of phoneme.

The authenticator 11 performs a personal authentication of the user using either one, voice (voiceprint by way of example) or a face image, as described above. As the personal authentication is successful, the authenticator 11 reads personal information of the authenticated user from the personal information DB 32. The personal information DB 32 is a database associating each user name with personal information (nickname and profile) as shown in FIG. 4. The nickname is a nominal designation of the user and the profile (for example, his birthday and/or family members) is information useful for interaction with the user. For example, when the authenticator 11 successfully authenticates a user A, the read personal information of the user A (Mr. A and a) is used in interaction.

Returning to FIG. 2, the holding determiner 12 determines whether the device is in the held state indicating that the device is held by the user. Here, the held means that the user is holding the robot 100 (interactive device 1). Whether the device is in the held state is detected by using the acceleration sensor 45. In other words, when the user is not holding the robot 100, the acceleration of the robot 100 at rest is 0 G in the horizontal directions (the XY components) and 1 G (approximately 9.8 m/s$^2$) in the vertical direction (the Z component). Thus, the magnitude of acceleration obtained by combining the components in the horizontal directions and vertical direction (the magnitude of acceleration consisting of the XYZ components) is approximately 1 G.

On the other hand, when the user is holding the robot 100, the acceleration changes in the horizontal components and vertical component and the acceleration fluctuates. Generally, this fluctuation causes the magnitude of acceleration consisting of the XYZ components to exceed 1 G. Therefore, a first threshold equal to or higher than 1 G is preset. Then, when acceleration equal to or higher than the first threshold is output from the acceleration sensor 45 successively for a given length of time, the held state is assumed. In other words, the holding determiner 12 determines that the device is in the held state when the average value of acceleration in the horizontal and vertical directions output from the acceleration sensor 45 is equal to or higher than a first threshold and the acceleration equal to or higher than the first threshold is output from the acceleration sensor 45 successively for a given length of time.

In the held state, if the user holds the robot 100 from the front, naturally the user's face is more likely to fit within the field angle of the camera. So, when the user's face is not detected within the field angle of the camera 40 even though the holding determiner 12 has determined that the device is in the held state and the human detection sensor 46 has detected a person, the controller 10 determines that the user is holding the robot from behind.

Here, when the robot 100 is actually used, a third party may hold the robot 100 after the user holds the robot 100. In such a case, generally, the fluctuation in acceleration becomes larger than the first threshold. Therefore, a second threshold higher than the first threshold is preset and when acceleration equal to or higher than the second threshold is output from the acceleration sensor 45 successively for a given length of time, an unstably-held state is assumed. Alternatively, when a third party holds the robot 100 instead of the user, the axis of the acceleration sensor 45 may change because of inversion of the robot 100 or the like, whereby the axial change may be monitored to detect the unstably-held state.

As described above, the holding determiner 12 determines one of the following three states using the acceleration sensor 45: the state in which the user is not holding the device (the not-held state), the state in which the user is holding the device (the stably-held state), and the state in which the holder is changed to a third party from the user (the unstably-held state). Here, the stably-held state refers to the case in which the average acceleration value is equal to or higher than a first threshold and the unstably-held state refers to the case in which the average acceleration value is equal to or higher than a second threshold.

Then, the speech urger 13 urges the user to speak when the authenticator 11 is unsuccessful in a personal authentication by voice and a face image. Here, when the user does not speak and the user's face does not fit within the field angle of the camera the speech urger 13 voluntarily asks a question to urge the user to speak. In this embodiment, particularly, the speech urger 13 asks a question to urge the user to speak when the authenticator 11 unsuccessfully authenticates the user and the holding determiner 12 determines that the device is in the stably-held state with the user. This is for preventing unsuccessful personal authentication in spite of the fact that the user is holding the robot 100.

Also, the human detection sensor 46 detecting a person means that the user or the third party is near the robot 100. So, if the user's face does not fit within the field angle of the camera 40 even when the human detection sensor 46 detects a person, the speech urger 13 voluntarily asks a question to urge the user to speak. Namely, if the authenticator 11 unsuccessfully authenticates the user even though the human detection sensor 46 detects that a person is near the robot 100, the speech urger 13 voluntarily asks a question to urge the user to speak, and the authenticator 11 authenticates the user (in particular, performs a personal authentication to identify personal information of the user).

Here, a question is voluntarily asked by using a question template in the dialogue DB 33 shown in FIG. 5. In other words, the speech urger 13 randomly selects one question sentence in the question template, creates sound from the text of the question sentence, and asks the user the question. The question has only to be an interrogative sentence for a personal authentication with answer voice of the user, and preferably excludes closed questions to which the user can give a short answer "Yes" or "No." Additionally, it is recommended to intentionally avoid unnatural questions (for example, "who are you?" and the like) and ask natural questions so that the user does not notice that a personal authentication has been unsuccessful. For example, as shown in FIG. 5, "How are you today?", "How was your day today?" and the like are used.

Then, when the authenticator 11 successfully authenticates the user, the interaction controller 14 interacts with the user using personal information of the user. On the other hand, when the authenticator 11 unsuccessfully authenticates the user, the interaction controller 14 interacts with the user with no use of personal information of the user. The interaction controller 14 uses the dialogue DB 33 in the interaction. The dialogue DB 33 includes the above-described question template shown in FIG. 5 and an answer template shown in FIG. 6. The answer template is a template for answering to the speech of the user, in which input text is associated with output text, personal information, and an emotion-expressing parameter.

The input text is text into which voice spoken by the user is transformed. The output text is an answer sentence to the input text. The personal information is personal information (nickname and profile) read from the personal information DB 32. The emotion-expressing parameter is a parameter presenting a degree of emotional goodness while the interactive device 1 interacts with the user.

When the personal authentication is successful and the personal information is used, the field of personal information has the authenticated user name (A in the example of FIG. 6). On the other hand, when the personal authentication is unsuccessful, the field of personal information is blank. Moreover, the emotion-expressing parameter of the interactive device 1 is "GOOD" as in FIG. 6 when the personal authentication is successful and the emotion-expressing parameter of the interactive device 1 is "MODERATE" when the personal authentication is unsuccessful.

When the personal authentication is successful, the interaction controller 14 adds the personal information to the output text and sets the emotion-expressing parameter for "GOOD" to interact with the user. For example, if the input text is a greeting "GOOD MORNING," the interaction controller 14 adds the nickname "Mr. A" that is personal information to the corresponding output text "GOOD MORNING" and speaks "MR. A, GOOD MORNING" in a raised voice tone corresponding to "GOOD." Along with it, the facial expression of the interactive device 1 may be changed to a happy face so as to correspond to "GOOD." On the other hand, when the personal authentication is unsuccessful, the interaction controller 14 gives the user an answer "GOOD MORNING" with no use of personal information and no emotional change.

Here, the answer template has multiple pieces of input text prepared in each category including greetings and has variations enough to keep conversation back and forth several times. Moreover, the input text does not have to be an exact match and may be nearly a match or a keyword such as a noun included in the speech of the user. Moreover, the way of using the personal information (adding the nickname to the beginning of a sentence) is given by way of example. Needless to say, an answer taking into account profile such as the family members and birthday can be given. Just in case, it is remarked that there are a thousand ways of creating a dialogue using the answer template and the embodiment is given simply by way of example.

Returning to FIG. 2, the resetter 15 resets the personal authentication of the user by the authenticator 11 when the holding determiner 12 determines that a third party holds the device. In other words, the resetter 15 resets the personal authentication when the holder is changed and the device becomes in the unstably-held state. For example, since the device becomes in the unstably-held state when the holder is changed from the user A to a user B, the resetter 15 resets the personally-authenticated user A.

Figure 7:
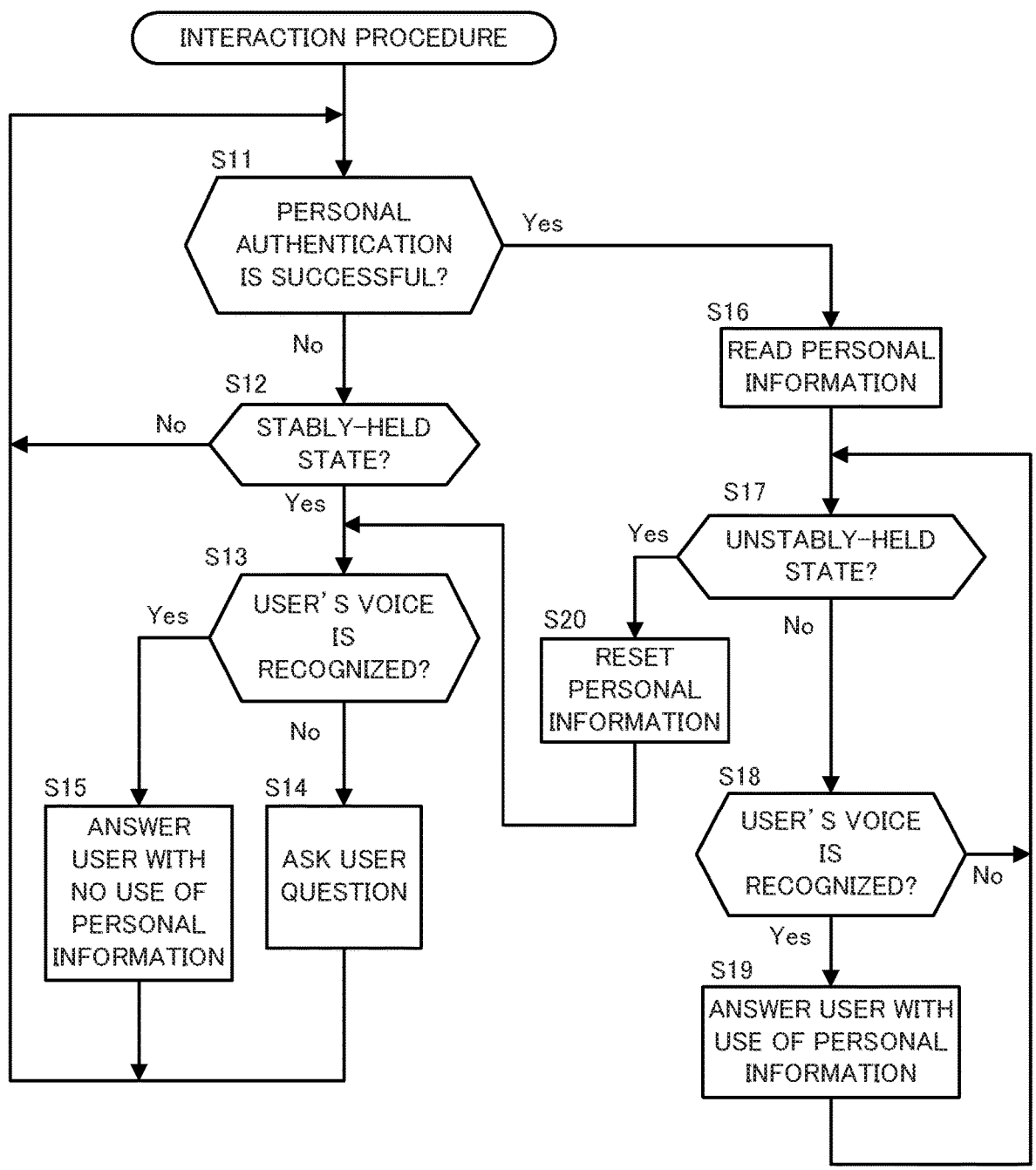
FIG. 7 is a flowchart of the interaction procedure according to the embodiment.

The functions of the interactive device 1 are described above with reference to FIGS. 3 to 6. The interaction procedure will be described hereafter with reference to FIG. 7. This procedure is successively executed while the interaction function of the robot 100 is ON. Moreover, it is assumed that the robot 100 turns on the camera 40 and microphone 41 for a personal authentication and performs the personal authentication by voice and a face image in a simultaneous parallel manner.

First, the authenticator 11 determines whether the personal authentication is successful (Step S11). Here, the personal authentication being successful means that the user is authenticated with a face image or voice. On the other hand, the personal authentication being unsuccessful means that the user is not authenticated with a face image and voice.

Here, if the personal authentication is unsuccessful (Step S11; No), the holding determiner 12 determines whether the device is in the stably-held state (Step S12). If the device is not in the stably-held state (Step S12; No), in other words if the device is in the not-held state or in the unstably-held state, the processing returns to the Step S11. On the other hand, if the device is in the stably-held state (Step S12; Yes), the interaction controller 14 determines whether the user's voice is recognized (Step S13). If the user's voice is recognized (Step S13; Yes), the interaction controller 14 answers the user using the answer template with no use of personal information (Step S15) and returns to the Step S11. In this case, the personal authentication is performed with the user's voice.

On the other hand, if the user's voice is not recognized (Step S13; No), the speech urger 13 asks the user a question using the question template (Step S14) and returns to the Step S11. In this case, the personal authentication is performed using the user's voice obtained from an answer to a voluntary question. As just described, if the user does not speak while the device is in the stably-held state and the personal authentication is unsuccessful, a question is voluntarily asked to urge the user to speak.

On the other hand, if the personal authentication is successful (Step S11; Yes), the interaction controller 14 reads personal information from the personal information DB 32 (Step S16). Then, the holding determiner 12 determines whether the device is in the unstably-held state (Step S17). If the device is not in the unstably-held state (Step S17; No), in other words if the device is in the stably-held state or in the not-held state, the interaction controller 14 determines whether the user's voice is recognized (Step S18). If the user's voice is not recognized (Step S18; No), the processing returns to the Step S17. On the other hand, if the user's voice is recognized (Step S18; Yes), the interaction controller 14 answers the user using the personal information (Step S19) and returns to the Step S17.

As described above, when the personal authentication is successful, an answer is given as the user's voice is recognized unless the device becomes in the unstably-held state (while the user is holding the interactive device 1 or the interactive device 1 is in the not-held state and at rest). This is for taking into account that the user pays a little attention to the interactive device 1 when the user is doing something (for example, watching the television) while holding the interactive device 1 or when the device is in the not-held state. However, voluntary questions (for example, a question "Mr. A, how was your day today?") may be asked using the personal information even if the user's voice is absent.

Here, if the device is in the unstably-held state (Step S17; Yes), in other words if the holder is changed from the personally-authenticated user to a third party, the resetter 15 resets the personal authentication (Step S20) to the state of unsuccessful personal authentication. Subsequently, if the user's voice is not recognized in the Step S13 (Step S13; No), in other words if the third party does not speak, the speech urger 13 voluntarily asks a question (Step S14) and a personal authentication of the third party is performed. If the third party speaks, the interaction controller 14 answers the third party with no use of personal information (Step S15) and a personal authentication of the third party is performed.

As described above, comprising the authenticator 11 and speech urger 13, the interactive device 1 according to this embodiment can voluntarily ask a question to urge the user to speak so as to perform authentication (particularly, a personal authentication) when authentication by voice and a face image is unsuccessful. Particularly, in this embodiment, a question is voluntarily asked when the holding determiner 12 determines that the device is in the stably-held state and the personal authentication is unsuccessful. Therefore, compared with the case of being vocally guided into the field angle for a personal authentication with a face image, the user has only to answer a question he is asked, whereby the user is not particularly conscious about being authenticated. Therefore, the user does not feel strange and natural personal authentication can be performed where the personal authentication is unsuccessful (particular, where the personal authentication is unsuccessful although the user is holding the interactive device 1 and they are close to each other).

Moreover, when the device is in the unstably-held state, in other words when a third party other than the user holds the device in the middle of interaction with the authenticated user, the personal authentication of the user is reset. Therefore, the device does not interact with the third party using the personal information of the previous user in spite of the holder being changed. Therefore, the third party does not feel strange in interaction with the interactive device 1. Additionally, the third party is authenticated by voluntarily speaking or answering a question, whereby the authenticated subject can smoothly be switched.

Moreover, the interaction controller 14 interacts using the personal information of the user when the personal authentication of the user is successful. Therefore, the user has a sense of affinity and thereby can promote the bond with the interactive device 1.

An embodiment is described above. The above embodiment is given by way of example and needless to say, the configuration of the interactive device 1 and the contents of the interaction procedure are not restricted those described in the above embodiment.

Modified Embodiment

The above embodiment is described using the case of a personal authentication. This is not restrictive. Age-gender authentication may be performed for authenticating the age or gender of the user. The age-gender authentication is authentication to identify age-gender information presenting at least either one, the age or gender of the user.

In this modified embodiment, the authenticator 11 performs age-gender authentication to identify age-gender information presenting the age or gender of the user. In the age-gender authentication, unlike the personal authentication for which a database of face images and voiceprints of individuals is created in advance for identifying the personal information, only a database of information sufficient for identifying the age or gender has to be created.

For example, the gender can be distinguished by the voice tone obviously different between the male and female (difference in voice pitch), body frame, hairdo, and the like. Alternatively, the age can be distinguished between children and the aged by the above-mentioned voice tone, body frame, physical size, and the like. For estimating a more precise age (for example, for estimating an age group such as teens, twenties, thirties, . . . sixties), information for identifying the age group (for example, sample voice data of teens) may be stored. Generally, the volume of information to prestore is smaller for age-gender authentication than for a personal authentication, whereby the storage capacity can be reduced.

Then, if the authenticator 11 successfully authenticates the age-gender of the user, the interaction controller 14 interacts with the user using the age-gender information of the user. For example, the interaction controller 14 uses honorific expressions when the user is an old person, and interacts with the user in a manner suitable for children when the user is a child. Moreover, a question voluntarily asked when the age-gender authentication by voice and a face image is unsuccessful may vary depending on the presumed age-gender of the user. For example, question templates for the aged and for children are prepared, and the speech urger 13 may ask a question "How is your physical condition?" from the one for the aged or a question "What shall we do for fun today?" from the one for children.

As described above, the above modified embodiment can voluntarily ask a question and perform natural age-gender authentication when age-gender authentication by voice and a face image is unsuccessful with the user who is an interaction partner. Additionally, it is possible to roughly classify a user by age-gender authentication and interact with the user according to his age-gender group.

In the above-described embodiment and modified embodiment, the speech urger 13 voluntarily asks a question to obtain voice of the user for authentication (personal authentication or age-gender authentication). However, this is not restrictive. For example, in place of interrogative questions, the speech urger 13 may make a remark that interests the user. For example, the interactive device 1 may acquire from the cloud (Internet) and read out a seasonal topic or latest news story. This is because if the user reacts with voice, the authentication will be successful. Alternatively, the speech urger 13 may change the behavior (a motion attracting the user) or facial expression of the interactive device 1 to urge the user to speak. In short, as long as voice of the user is obtained for a personal authentication or age-gender authentication, any means can be used.

Moreover, in the above-described embodiment, the personal information DB 32 stores a nickname and profile as the personal information. This is not restrictive. For example, information useful for interaction such as hobbies, preferences, favorite topics, past conversation history, and total interaction time of the user may be stored. Particularly, it may be possible to analyze the topics the user is prone to like based on past conversation history and if asking a question, ask a question on such topics. Moreover, it may be possible that when the total interaction time is extremely shorter than other users, it is assumed that the user is not fond of the interactive device 1 and the emotion-expressing parameter is kept "MODERATE" instead of changing to "GOOD" even through the personal authentication is successful.

Moreover, the interaction procedure of the above embodiment is described in regard to the case in which the personal authentication is successful and the case in which the personal authentication is unsuccessful. However, in some cases, a user whose user name is not registered at the authentication DB 31, namely an unregistered user, may be detected even though voice or a face image is obtained. When an unregistered user is detected, although it depends on the design specification, it may be possible to assume a suspicious individual and terminate the interaction or continue the interaction even with an unknown person. In the case of continuing the interaction, as in the embodiment, the interaction may be performed using the question template and answer template in the dialogue DB 33 with no use of personal information.

Moreover, the above embodiment is described on the assumption that the interactive device 1 is built in the toy robot 100. This is not restrictive. The interactive device 1 comprises the authentication function and interaction function and can be installed in any robot using those functions. For example, the interactive device 1 may be installed in a cleaning robot or search robot.

The functions of the interactive device 1 of the present disclosure can be implemented by a computer such as a conventional personal computer (PC). Specifically, the above embodiment is described on the assumption that programs for the interaction procedure executed by the interactive device 1 are prestored in the ROM of the controller 10. However, the programs may be saved and distributed on a non-transitory computer-readable recording medium such as a flexible disc, compact disc read only memory (CD-ROM), digital versatile disc (DVD), and magneto optical disc (MO) and installed on a computer to configure a computer capable of realizing the above-described functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An interactive device with artificial intelligence for performing authentication and comprising:
    a camera;
    an acceleration sensor for measuring acceleration in three axes;
    an artificial intelligence controller, the artificial intelligence controller being configured to perform operations including:
    acquiring an image or a voice of a user as user information for authentication of the user;
    authenticating the user based on the acquired user information;
    determining whether authentication of the user has succeeded or failed; and
    when the artificial intelligence controller determines that the authentication of the user has succeeded, performing interaction using personal information of the user, according to the authenticated user;
    wherein acquiring the image or the voice of the user comprises, by the artificial intelligence controller:
    determining whether the interactive device is in a held state indicating that the interactive device is held by the user; and
    when a user's face does not fit within a field angle of the camera even though the artificial intelligence controller determines that the interactive device is in the held state, urging the user to speak by outputting acquired output text, wherein the acquired output text includes at least one of a seasonal topic or latest news;
    wherein the artificial intelligence controller authenticates the user based on the user's response to the output text when the user is urged to speak; and
    wherein the artificial intelligence controller determines that the interactive device is in the held state when a magnitude of an acceleration obtained by combining the components in each of the axes that are measured by the acceleration sensor is maintained higher than a first threshold for a given length of time.

2. The interactive device according to claim 1, wherein the artificial intelligence controller is further configured to:
    perform a personal authentication as the authentication to identify the personal information of the user.

3. The interactive device according to claim 1, wherein the artificial intelligence controller is further configured to:
    perform age-gender authentication as the authentication to identify, as the personal information, age-gender information presenting the age or gender of the user; and
    interact with the user using the age-gender information of the user when the artificial intelligence controller determines that the age-gender authentication of the user has succeeded.

4. The interactive device according to claim 1, further comprising a human detection sensor for detecting a person,
    wherein the artificial intelligence controller is further configured to urge the user to speak when the user's face does not fit within the field angle of the camera even though the human detection sensor detects the person.

5. The interactive device according to claim 1, wherein the artificial intelligence controller is further configured to urge the user to speak when the user's face does not fit within the field angle of the camera because of the user holding the interactive device from behind.

6. The interactive device according to claim 1, wherein the artificial intelligence controller is further configured to reset the authentication of the user when the magnitude of the acceleration obtained by combining the components in each of the axes that are measured by the acceleration sensor is maintained for the given length of time at a level higher than a second threshold that is higher than the first threshold during interaction with the user.

7. The interactive device according to claim 6, wherein the artificial intelligence controller is further configured to determine that the interactive device is held by a third party when the magnitude of the acceleration is maintained for the given length of time at a level higher than the second threshold and the acceleration sensor detects an axial change.

8. The interactive device according to claim 1, wherein the artificial intelligence controller is further configured to:
    perform control to output the acquired output text to urge the user to speak when the authentication of the user by the voice of the user or the image of the user acquired as the user information has failed;

acquire, as the user's response to the output text, a voice spoken by the user;
authenticate the user by the acquired voice.

9. The interactive device according to claim 1, wherein the artificial intelligence controller is further configured to:
urge the user to speak when the artificial intelligence controller determines that the authentication of the user has failed and that the interactive device is in the held state.

10. The interactive device according to claim 9, wherein the artificial intelligence controller is further configured to:
determine whether a third party other than the user holds the interactive device during interaction with the user; and
reset authentication of the user when the artificial intelligence controller determines that the third party holds the interactive device.

11. A robot comprising the interactive device according to claim 1.

12. An interaction method using a device including a camera, an acceleration sensor for measuring acceleration in three axes, and an artificial intelligence controller, the method comprising:
acquiring an image or a voice of a user as user information for authentication of the user;
authenticating the user based on the acquired user information;
determining whether authentication of the user has succeeded or failed; and
when it is determined that the authentication of the user has succeeded, performing interaction using personal information of the user according to the authenticated user;
wherein acquiring the image or the voice of the user comprises:
determining whether the device is in a held state indicating that the device is held by the user; and
when a user's face does not fit within a field angle of the camera even though it is determined that the device is in the held state, urging the user to speak by outputting acquired output text, wherein the acquired output text includes at least one of a seasonal topic or latest news,
wherein when the user is urged to speak, the user is authenticated based on the user's response to the output text; and
wherein it is determined that the device is in the held state when a magnitude of an acceleration obtained by combining the components in each of the axes that are measured by the acceleration sensor is maintained higher than a first threshold for a given length of time.

13. A non-transitory recording medium storing a program that is executable by a computer of a device including a camera and an acceleration sensor for measuring acceleration in three axes, to control the computer to function as an artificial intelligence controller which performs functions comprising:
acquiring an image or a voice of a user as user information for authentication of the user;
authenticating the user based on the acquired user information;
determining whether authentication of the user has succeeded or failed; and
when it is determined that the authentication of the user has succeeded, performing interaction using personal information of the user according to the authenticated user;
wherein acquiring the image or the voice of the user comprises:
determining whether the device is in a held state indicating that the device is held by the user; and
when a user's face does not fit within a field angle of the camera even though it is determined that the device is in the held state, urging the user to speak by outputting acquired output text, wherein the acquired output text includes at least one of a seasonal topic or latest news,
wherein when the user is urged to speak, the user is authenticated based on the user's response to the output text; and
wherein it is determined that the device is in the held state when a magnitude of an acceleration obtained by combining the components in each of the axes that are measured by the acceleration sensor is maintained higher than a first threshold for a given length of time.

14. An interactive device with artificial intelligence for performing authentication and comprising a memory and an artificial intelligence controller, the interactive device being configured to change an emotional expression of the interactive device, and the artificial intelligence controller being configured to:
acquire user information for authentication of a user;
authenticate the user based on the acquired user information;
determine whether authentication of the user has succeeded or failed;
when the processor determines that the authentication of the user has failed, (i) urge the user to speak by outputting acquired output text, wherein the acquired output text includes a seasonal topic, and (ii) authenticate the user based on the user's response to the output text; and
when the artificial intelligence controller determines that the authentication of the user has succeeded, control the interactive device using personal information of the user to change the emotional expression of the interactive device.

* * * * *